(12) United States Patent
Carver et al.

(10) Patent No.: US 9,214,280 B2
(45) Date of Patent: Dec. 15, 2015

(54) VERY THIN DIELECTRICS FOR HIGH PERMITTIVITY AND VERY LOW LEAKAGE CAPACITORS AND ENERGY STORING DEVICES

(71) Applicant: Carver Scientific, Inc., Baton Rouge, LA (US)

(72) Inventors: David R. Carver, Baton Rouge, LA (US); Robert G. Carver, Austin, TX (US)

(73) Assignee: Carver Scientific, Inc., Baton Rouge, LA (US)

( * ) Notice: Subject to any disclaimer, the term of this patent is extended or adjusted under 35 U.S.C. 154(b) by 0 days.

(21) Appl. No.: 14/490,873

(22) Filed: Sep. 19, 2014

(65) Prior Publication Data

US 2015/0000090 A1    Jan. 1, 2015

Related U.S. Application Data

(63) Continuation-in-part of application No. 13/853,712, filed on Mar. 29, 2013, now Pat. No. 9,011,627, and a continuation-in-part of application No. 13/426,440, filed on Mar. 21, 2012, now abandoned, said (Continued)

(51) Int. Cl.
*H01G 4/14* (2006.01)
*H01G 13/00* (2013.01)
(Continued)

(52) U.S. Cl.
CPC . *H01G 4/14* (2013.01); *H01G 4/06* (2013.01); *H01G 4/20* (2013.01); *H01G 4/206* (2013.01); *H01G 13/00* (2013.01); *Y10T 29/435* (2015.01)

(58) Field of Classification Search
CPC .................................. H01G 4/14; H01G 13/04
USPC ................................ 156/272.2, 275.5; 427/79
See application file for complete search history.

(56) References Cited

U.S. PATENT DOCUMENTS

| | | |
|---|---|---|
| 2,778,762 A | 1/1957 | Eisler |
| 3,342,754 A | 9/1967 | Gorham |
| 3,616,314 A | 10/1971 | Settineri et al. |

(Continued)

FOREIGN PATENT DOCUMENTS

| | | |
|---|---|---|
| JP | 54145000 A | 11/1979 |
| WO | WO 2009/046341 A1 | 4/2009 |

(Continued)

OTHER PUBLICATIONS

Ihn et al., "Dielectric Functions of Cd(1−x)Mg(x)Te Alloy Films by Using Spectroscopic Ellipsometry," *Journal of Korean Physical Society*, vol. 43, No. 4, pp. 634-637 (2003).

(Continued)

*Primary Examiner* — Daniel McNally
(74) *Attorney, Agent, or Firm* — Klarquist Sparkman, LLP

(57) ABSTRACT

Methods are disclosed for creating extremely high permittivity dielectric materials for use in capacitors and energy storage devices. High permittivity materials suspended in an organic non-conductive media matrix with enhanced properties and methods for making the same are disclosed. Organic polymers, shellac, silicone oil, and/or zein formulations are utilized to produce thin film low conductivity dielectric coatings. Transition metal salts as salt or oxide matrices are formed at low temperatures utilizing mild reducing agents.

28 Claims, 5 Drawing Sheets

Related U.S. Application Data application No. 13/853,712 is a continuation-in-part of application No. 13/671,546, filed on Nov. 7, 2012, now abandoned, and a continuation-in-part of application No. 13/599,996, filed on Aug. 30, 2012, now Pat. No. 8,633,289, and a continuation-in-part of application No. 12/245,665, filed on Oct. 3, 2008, now Pat. No. 8,432,663.

(60) Provisional application No. 61/466,058, filed on Mar. 22, 2011.

(51) Int. Cl.
    *H01G 4/20* (2006.01)
    *H01G 4/06* (2006.01)

(56) References Cited

U.S. PATENT DOCUMENTS

| | | |
|---|---|---|
| 3,907,748 A | 9/1975 | Marvel et al. |
| 4,359,327 A | 11/1982 | Armand et al. |
| 4,500,562 A | 2/1985 | Jahn et al. |
| 4,532,369 A | 7/1985 | Hartner |
| 4,638,407 A | 1/1987 | Lundsgaard |
| 4,675,462 A | 6/1987 | Ungarelli et al. |
| 4,734,533 A | 3/1988 | Ungarelli et al. |
| 4,748,542 A | 5/1988 | Lundsgaard |
| 4,769,505 A | 9/1988 | Lee et al. |
| 4,795,838 A | 1/1989 | Bornengo et al. |
| 4,806,702 A | 2/1989 | Lee et al. |
| 4,816,608 A | 3/1989 | Bornengo et al. |
| 4,849,559 A | 7/1989 | Lee et al. |
| 4,853,488 A | 8/1989 | Ungarelli et al. |
| 4,886,923 A | 12/1989 | Ungarelli et al. |
| 4,942,061 A * | 7/1990 | Domes ............... 427/104 |
| 5,079,674 A | 1/1992 | Malaspina |
| 5,110,903 A | 5/1992 | Lee et al. |
| 5,144,529 A * | 9/1992 | Takahashi ............... 361/323 |
| 5,266,291 A | 11/1993 | Drnevich et al. |
| 5,783,933 A | 7/1998 | Bailly |
| 6,096,234 A | 8/2000 | Nakanishi et al. |
| 6,307,735 B1 | 10/2001 | Saito et al. |
| 6,602,741 B1 | 8/2003 | Kudoh et al. |
| 6,674,635 B1 * | 1/2004 | Fife et al. ............... 361/523 |
| 7,033,406 B2 | 4/2006 | Weir et al. |
| 7,164,197 B2 | 1/2007 | Mao et al. |
| 7,170,260 B2 | 1/2007 | Thrap |
| 7,190,016 B2 | 3/2007 | Cahalen et al. |
| 7,279,777 B2 | 10/2007 | Bai et al. |
| 7,342,755 B1 | 3/2008 | Horvat et al. |
| 7,495,887 B2 | 2/2009 | Cox |
| 7,781,358 B2 | 8/2010 | Hackenberger et al. |
| 8,432,663 B2 | 4/2013 | Carver |
| 8,633,289 B2 | 1/2014 | Carver et al. |
| 8,940,850 B2 | 1/2015 | Carver et al. |
| 2004/0210289 A1 * | 10/2004 | Wang et al. ............... 607/116 |
| 2006/0034035 A1 | 2/2006 | Maruo et al. |
| 2006/0074164 A1 * | 4/2006 | Slenes et al. ............... 524/413 |
| 2008/0171230 A1 * | 7/2008 | Zou et al. ............... 428/704 |
| 2009/0090999 A1 | 4/2009 | Carver |
| 2012/0241085 A1 | 9/2012 | Carver |
| 2013/0224397 A1 * | 8/2013 | Carver ............... 427/547 |
| 2013/0229157 A1 | 9/2013 | Carver |
| 2014/0295101 A1 * | 10/2014 | Carver ............... 427/547 |
| 2015/0000833 A1 | 1/2015 | Carver et al. |
| 2015/0017342 A1 | 1/2015 | Carver et al. |

FOREIGN PATENT DOCUMENTS

| | | |
|---|---|---|
| WO | WO 2014/035456 A2 | 3/2014 |
| WO | WO 2014/074122 A2 | 5/2014 |
| WO | WO 2014/161007 A2 | 10/2014 |

OTHER PUBLICATIONS

*Modern Cyclophane Chemistry*, Eds. Gleiter et al., John Wiley (2004).

* cited by examiner

VERY THIN DIELECTRICS FOR HIGH PERMITTIVITY AND VERY LOW LEAKAGE CAPACITORS AND ENERGY STORING DEVICES

CROSS REFERENCE TO RELATED APPLICATIONS

This application is a continuation-in-part of U.S. Nonprovisional application Ser. No. 13/426,440 filed Mar. 21, 2012, now abandoned, which is a nonprovisional of and claims the benefit of priority of U.S. Provisional Patent Application 61/466,058, filed Mar. 22, 2011, this application is also a continuation in part of U.S. Nonprovisional application Ser. No. 13/853,712, filed Mar. 29, 2013, now U.S. Pat. No. 9,011,627, which is a continuation in part of U.S. Nonprovisional application Ser. No. 13/671,546 filed Nov. 7, 2012, now abandoned, and a continuation-in-part of U.S. Nonprovisional application Ser. No. 13/599,996, filed Aug. 30, 2012, now as U.S. Pat. No. 8,633,289, and a continuation-in-part of U.S. Nonprovisional application Ser. No. 12/245,665 filed Oct. 3, 2008, now U.S. Pat. No. 8,432,663, the entire contents of which are incorporated herein by reference and made a part hereof.

FIELD OF THE INVENTION

This invention relates generally to capacitors and, more specifically, to formulations, structures and methods for creating high permittivity low leakage capacitors and energy storing devices.

BACKGROUND

In older literature, the term "dielectric constant" of a material is used to describe the polarization ability or "permittivity" of the material when placed in an electric field. The term "dielectric breakdown" was used to describe the voltage at which an insulator material would "breakdown" and conduct current. This dielectric breakdown voltage is also known as the dielectric strength. Since the abbreviated version for both of these terms is "dielectric," and the material itself is called the dielectric, there was some confusion in the literature as to what was being discussed. Thus, the term "permittivity" is now used (mostly) to describe the ability of a material to charge polarize and change the "dielectric constant" of its volume of space to a higher value from that of a vacuum. Dielectric breakdown voltage is sometimes used to indicate the dielectric strength of the material.

The relative permittivity of a material is a measurement of its static dielectric constant divided by the dielectric constant of vacuum.

$$e_r = \frac{e_s}{e_0} \quad \text{Eq. 1}$$

where:
$e_r$=relative permittivity
$e_s$=measured permittivity
$e_o$=electrical permittivity of vacuum (8.8542 E-12 F/m)

Thus, when the phrase "good dielectric" is used, it means a material that displays good electrical insulation characteristics such as a high breakdown voltage and a low conductivity. A material that has a good "dielectric constant" for a capacitor means it has a good "permittivity" (i.e., high value) and increases the capacitance of a given size capacitor when placed between the electrodes by a "good" (i.e., high) amount.

As used herein, a high permittivity means a good permittivity. Generally speaking, a material having a relative permittivity of at least 3.3 has a "high permittivity." Additionally, a material that has a permittivity that has been enhanced by at least ten percent (10%) using a permittivity enhancement technique, such as the techniques described herein, also has a high permittivity.

A capacitor is formed when two conducting plates are separated by a non-conducting media, called the dielectric. The value of the capacitance depends on the size of the plates, the distance between the plates and the properties of the dielectric. The relationship is:

$$C = \frac{e_0 \cdot e_r A}{d} \quad \text{Eq. 2}$$

where:
$e_o$=electrical permittivity of vacuum (8.8542 E-12 F/m)
$e_r$=relative permittivity
A=surface of one plate (both the same size)
d=distances between two plates While the electrical permittivity of a vacuum is a physical constant, the relative electrical permittivity depends on the material.

TABLE 1

Typical Relative Electrical Permittivities

| Material | $e_r$ |
|---|---|
| Vacuum | 1 |
| Water | 80.1 (20° C.) |
| Organic Coating | 4-8 |

A large difference is noticed between the electrical permittivity of water and that of an organic coating.

Relative Static Permittivities of Some Materials at Room Temperature

TABLE 2

| Material | Dielectric |
|---|---|
| Vacuum | 1 (by definition) |
| Air | 1.00054 |
| Polytetrafluoroethylene | 2.1 |
| Polyethylene | 2.25 |
| Polystyrene | 2.4-2.7 |
| Paper | 3.5 |
| Silicon dioxide | 3.7 |
| Concrete | 4.5 |
| Pyrex (glass) | 4.7 (3.7-10) |
| Rubber | 7 |
| Diamond | 5.5-10 |
| Salt | 3-15 |
| Graphite | 15-10 |
| Silicon | 11.68 |
| Methanol | 30 |
| Furfural | 42 |
| Glycerol | 47-68 |
| Water | 88-80.1-55.3-34.5 |
| Hydrofluoric acid | 83.6 (0° C.) |
| Formamide | 84.0 (20° C.) |
| Sulfuric acid | 84-100 (20-25° C.) |

TABLE 2-continued

| Material | Dielectric |
| --- | --- |
| Hydrogen peroxide | 128 aq-60 (−30-25° C.) |
| Hydrocyanic acid | 158.0-2.3 (0-21° C.) |
| Titanium dioxide | 86-173 |
| Strontium titanate | 310 |
| Barium strontium titanate | 500 |
| | 1250-10,000 |
| Barium titanate | (20-120° C.) |
| (La Nb):(Zr Ti)PbO3 | 500, 6000 |

Materials which have large dipole moments and high permittivity are often conductive salts or very polar inorganic acids or bases. In these cases their liquid form is difficult to use and/or toxic or corrosive. This makes their utility difficult and dangerous. Often, polar salts display undesirable conductivity when they are slightly impure and/or exposed to atmospheric conditions with humidity.

Inorganic salts which display nonconductive behavior and very high permittivities are inorganic salts of the transition metals and other inorganic salts that display high permittivities due to their crystal lattice structures. These materials are difficult to use due to their crystalline nature. Much effort has been expended to make these types of materials more manufacturable through the use of thin coatings and methods of high temperature fusing and sintering.

The invention is directed to overcoming one or more of the problems and solving one or more of the needs as set forth above.

SUMMARY OF THE INVENTION

To solve one or more of the problems set forth above, in an exemplary implementation of the invention, improvements for creating very thin film dielectric materials with extremely high permittivity which increases the amount of energy able to be stored in a capacitor or energy storage device are described herein.

Several high permittivity materials in an organic non-conductive media with enhanced properties and methods for making the same are disclosed.

According to one or more exemplary implementations, a method for the formation of thin films of some particular dielectric material is disclosed, wherein organic polymers, shellac, silicone oil, and/or zein formulations are utilized to produce low conductivity dielectric coatings. Additionally, according to one or more exemplary implementations, the formation of certain transition metal salts, as salt or oxide matrices, is demonstrated at low temperatures utilizing mild reducing agents. Additionally, according to one or more exemplary implementations, a general method for increasing the permittivity of the dielectric material is provided.

In one exemplary embodiment, a method for creating a spreadable thin coating of high permittivity dielectric material on a substrate, which is suitable for use in energy storage devices such as capacitors, entails creating a wetting agent solution by combining an organic polymer with a solvent and mixing the combined organic polymer with the solvent. After mixing the combined organic polymer with the solvent, any particulate matter not dissolved in the wetting agent solution is optionally removed. The wetting agent solution is then combined with a high permittivity dielectric material and mixed to create a smooth slurry. The smooth slurry is spread in a thin and even coating onto a first substrate suitable for use in energy storage devices. A drying agent may be added to the wetting agent solution, which may then be allowed to dry. By way of example and not limitation, the organic polymer may be a parylene, shellac, zein or silicon oil. A second substrate, also suitable for use in energy storage devices, may be placed onto the smooth slurry opposite the first substrate, with the smooth slurry being disposed between the first substrate and the second substrate. Optionally, a reducing agent and/or an iron cation or other transition metal cation may be added to the wetting agent solution. The reducing agent may comprise sodium borohydride.

In another embodiment, the method entails creating a first solution comprising a polymer mixed with a cross-linking agent. The first solution is combined with a high permittivity dielectric material and mixed to create a smooth slurry. The smooth slurry is spread in a thin and even coating onto a first substrate. By way of example and not limitation, the polymer may be a parylene, shellac, zein or silicon; and the cross linking agent may be a divinylsilane, cyanoacrylate, or an epoxy. Optionally, a reducing agent (e.g., sodium borohydride) and/or an transition metal cation may be added to the polymer. Particulate matter not dissolved into the first solution may be optionally removed by filtration, separation in a centrifuge or any other suitable technique.

In each embodiment, before a slurry is completely cured or dried and/or while the slurry is drying and/or curing, one or more permittivity enhancing fields may optionally be applied to the assembly (i.e., the first substrate, second substrate and slurry disposed therebetween). The field may be an electric field produced by by connecting a voltage source across the first substrate and the second substrate (e.g., an electric field having a strength greater than 100V/cm); and/or a magnetic field provided by as an example by placing the assembly between magnetic north and south poles of a magnetic source such that a magnetic field (e.g. a magnetic field having a strength greater than 1 Gauss) between the north pole of the magnetic source and the south pole of the magnetic source is about perpendicular to the outer surface of the first substrate and the outer surface of the second substrate.

In another embodiment, a layered dielectric is created with a first dielectric film layered on a different second dielectric film, each of which is composed of a primarily insulative film material and/or a high permittivity material. The film layers are sandwiched between and in contact with opposing first and second electrodes. Either during or after formation of the layers, permittivity of one or more layers is enhanced by one or more of: immersion in an electric field and/or magnetic field, and/or introducing a reductant into the film material.

Recognizing that perfect insulators do not exist, as used herein, an "insulative" material is a material that is primarily insulative. A primarily insulative material has a threshold breakdown field that exceeds the electric field applied across the substance during normal use as a capacitor, thus avoiding electrical breakdown during normal use.

In yet another embodiment, a mixed dielectric is created from an insulative film material and/or a high permittivity film material that exhibits a high permittivity. Again, The film is sandwiched between and in contact with opposing first and second electrodes. Either during or after formation of the film, permittivity is enhanced by one or more of: immersion in an electric field and/or magnetic field, and/or introducing a reductant into the film material.

BRIEF DESCRIPTION OF THE DRAWINGS

The foregoing and other aspects, objects, features and advantages of the invention will become better understood with reference to the following description, appended claims, and accompanying drawings, where:

Figure 1:
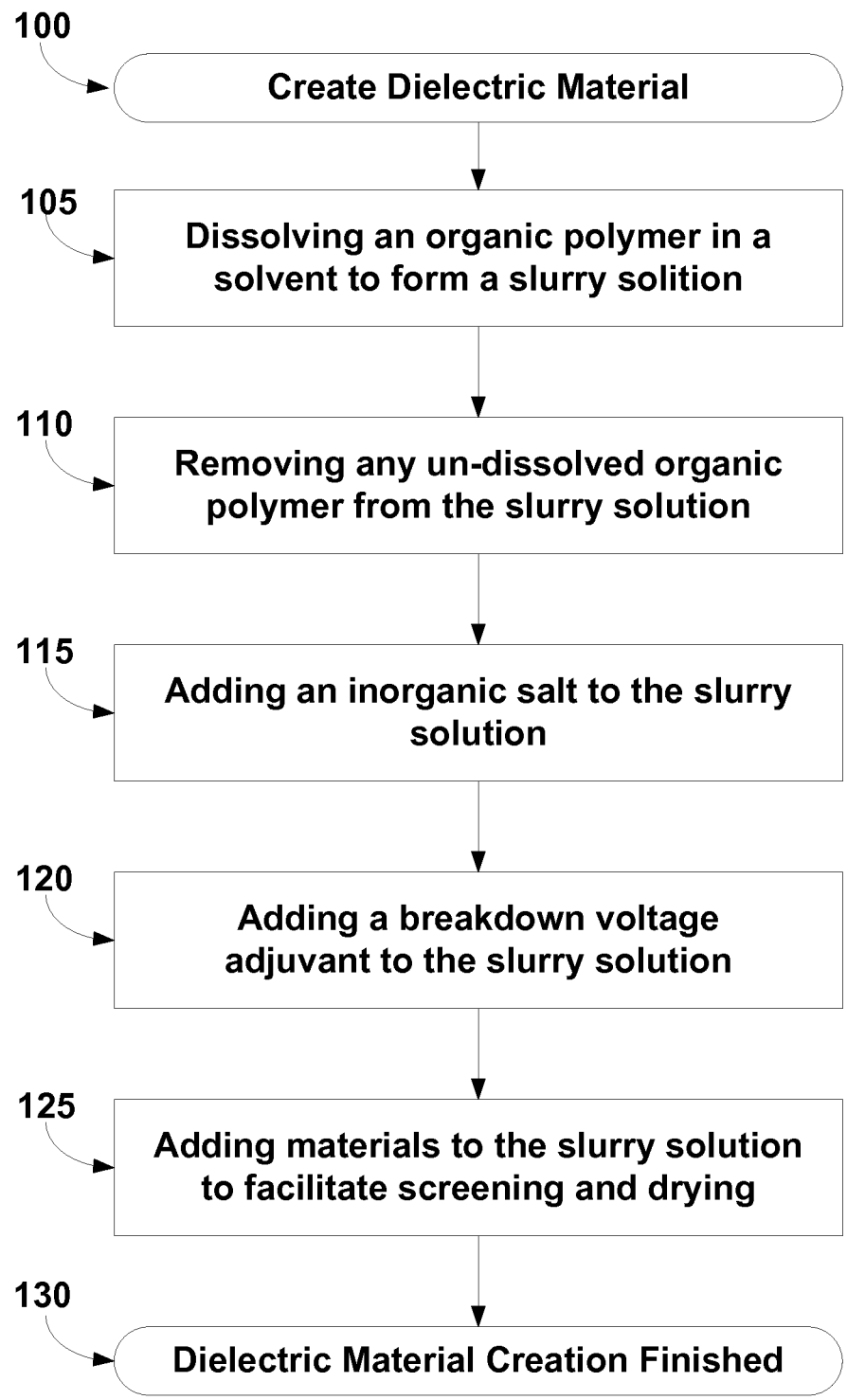
FIG. 1 is a process flow chart showing the steps used to mix and produce a slurry of dielectric material prior to applying the dielectric material to electrode plates.

Those skilled in the art will appreciate that the figures are not intended to be drawn to any particular scale; nor are the figures intended to illustrate every embodiment or step of every embodiment or implementation of the invention. The invention is not limited to the exemplary embodiments or implementations depicted in the figures or the specific components, configurations, shapes, relative sizes, ornamental aspects, proportions, steps, order of steps as shown in the figures.

DETAILED DESCRIPTION

Methods of forming high permittivity low leakage capacitors and energy storing devices are described herein. In one or more embodiments, the methods, materials and devices described in the present disclosure reduce the difficulties associated with the manufacture of high permittivity materials, decrease the difficulty of incorporation of these materials into devices, increase the performance of the materials, and show a method whereby the materials performance may be enhanced through the use of external fields used during manufacture.

When considering capacitors and their relationships to energy, to determine the work that must be done to charge a capacitor (i.e. the potential energy=E), the work performed is equal to the potential energy stored in the capacitor. The work performed to transfer a given amount of charge into a given capacitance is given by the following formula:

$$W = \frac{q^2}{C \cdot 2} \quad \text{Eq. 3}$$

where the relationship between capacitance and charge is:

$q = C \cdot V$ where q=charge (coulombs)
C=capacitance (Farads)
V=electric potential (volts).

Substitution for q in the work equation above provides, $$E = W = \frac{C \cdot V^2}{2} \quad \text{Eq. 4}$$

where E is the energy stored in the capacitor and is equal to the work that was performed to store the charge on the capacitor.

Thus, energy stored in a capacitor is related to the square of the voltage applied to the capacitor. It is therefore important that the voltage rating for the capacitor be as high as possible when energy storage is the primary use for the device. In one or more embodiments, besides having a high break down voltage, the capacitor also possesses a low leakage current. In other words, when the capacitor has been charged to a given voltage, the rate of charge conduction from one electrode to the other should be a relatively small value. When the capacitor is charged for energy storage over some given period of time, the rate of leakage is an acceptably low enough value that would vary depending on the use of the storage device (how long is it stored) and the "value" of the energy thus stored (how easy is it to recharge and the cost of the charge). An acceptable value for leakage would typically vary greatly from application to application. In all embodiments, leakage is something that is generally avoided and minimized.

In one or more embodiments, the highest value of relative permittivity and the highest voltage rating possible for a given level of leakage provides the best capacitor when evaluated for most energy storage applications. It should also be noted that the ability of the capacitor to discharge and charge at a reasonable rate is also an important factor. For most electronic applications, the ability of a capacitor to act as an ideal capacitor is an important parameter, especially when working at frequencies in the MHz range and above. The capacitor should also have the ability to fully discharge the charge that has been placed into its electrodes. All capacitive devices suffer from "irreversible dielectric absorption", but in the field of energy, discharging a capacitor to a level that is determined by its application will place a limit on how much of this effect is acceptable. The term dissipation factor is generally used to describe these losses, but in the field of energy storage the term "round trip efficiency" is also used. Both terms may be used herein for general purpose energy storage devices.

The general class of energy storage devices described herein is referred to as HED (High Energy Density) capacitors. These capacitors are electrostatic capacitors that should be distinguished from EDLC (Electrical Double Layer Capacitor) type of capacitors commonly referred to as supercapacitors or ultracapacitors. The capacitors described in this patent are referred to as Polyastics™ capacitors. Polyastic refers to the method by which they are made as well as the chemical make-up of the materials used in their construction.

In one or more embodiments, substantial improvements in the voltage rating, leakage current, energy storage per unit weight, and dielectric permittivity of an energy storage capacitor are provided. The scope of the improvements are generally described herein as they relate to the field of energy storage, but the methods and devices described herein can further be applied to other general applications wherein such improvements can be utilized to make devices that displays enhanced characteristics, including better frequency response, temperature characteristics, and reduced dielectric absorption.

In one or more embodiments, a high permittivity low leakage capacitor and energy storage device is described having the following improved characteristics:
1) High voltage rating (High break-down voltage),
2) High relative permittivities,
3) Low leakage current at maximum voltage charge,
4) Small size and weight,
5) Safe use due to low toxicity and other hazards,
6) Easy and better manufacturing procedures,
7) Environmentally friendly manufacturing,
8) High rate of discharge and charge, and
9) Ability to fully discharge.

It should be noted that previously known high permittivity materials have been subject to aging and brittleness, thereby providing substantial difficulty in forming such materials into the required shapes for their various uses. Further, since several of these previously known high permittivity materials are toxic, conventional machining and forming steps are deemed undesirable in a normal work environment. Due to their mechanical instability, the previously known high permittivity materials were also prone to electrical fatigue and mechanical fatigue when subjected to repeated electrical activations. Also, previously known high permittivity materials needed to be protected from the environmental changes, such as humidity changes, that can lead to micro fractures in the material and subsequent electrical failures. There was also a need to form previously known high permittivity materials at high temperatures. Due to their somewhat complex crystalline structures and need to be formed at high temperature, it has traditionally been difficult to make high permittivity materials into thin films. Often the crystal structures were poorly formed and the thin films showed reduced permittivity as thin films versus their bulk property. This is due to the fact that the permittivity of the known materials falls off sharply as the density of the electric field increases.

To alleviate these mechanical and electrical problems, in one or more embodiments, a permittivity material is provided that is mechanically ground and dispersed into an organic polymer for low temperature processing (i.e., temperature processing below approximately 500° C.). Alternatively, a material is described wherein the dielectric is formed as a mixture of either homogeneous nature or heterogeneous nature. Further alternatives are given by geometrically constructing the dielectric from two or more different permittivity materials in parallel layers whereby the two or more materials have complementary characteristics for making a composite dielectric with improved characteristics. Yet another alternative is to make a dielectric comprised of a viscous, yet still liquid, high permittivity material that is capable of retaining its conformational and physical arrangements induced by electric fields without substantially having the material dissipate its energy through thermal processes. The materials thereby retain their increased energy when the external electric fields are not driven by an external energy source. Additionally these materials have the ability to couple their increased energy conformations and/or physical arrangements to the external electric field. These materials will release their energy into the external electric field when the external electric field is modified by external perturbations, and such release of energy is substantially withdrawn from the device as electrical energy without substantial quantities of heat formation as a competitive process.

In different embodiments described herein, a variety of materials are described as being mixed and suspended in various polymers that possess the desired enhanced characteristics. In one or more embodiments, shellac and zein are found to offer enhanced properties for this application. In the case of both of these materials, the water and alcohol solubility of the polymer precursors provide desirable properties. Alternatively, polymers comprised of polyurethane, acrylic acid, methacrylic acid, methacrylic amides, polyvinylsulfonic acid, cyanoacrylates, polyvinylalcohols, polylactic acid, polyethylene terephthalates (PET), parylenes, silicones, or polyvinylsilanes have been demonstrated to provide enhanced dielectric properties when used with dielectric materials that need to be suspended in a polymer matrix. Although this list is not an exhaustive list of polymers that can be used, substitution of the polymer matrix with a variety of different polymers and/or non-electrically conductive materials is possible without modifying the novel substantive nature of the method.

In one or more embodiments, using the mechanically ground dielectrics, the permittivity of a suspension of the dielectric in the organic binder was enhanced by approximately 25% using shellac and zein over their dry particulate forms. Similar results were obtained with other polymers as listed above.

In one or more embodiments, an in situ formation of the dielectric was also performed to produce unique dielectrics possessing unique characteristics. In these embodiments, the addition of $NaBH_4$ in an alcoholic solution of zein was used to produce and enhance the functionality of the mixture. The resulting mixture, when treated with concentrated ammonium hydroxide and then heated, produces greatly enhanced dielectric material with permittivity increases on the order of 250% based on their change in permittivity from their simply being mixed with the organic binders. While even greater optimizations may are anticipated and the viability of the procedure and its substantial utility have been shown by the resulting properties of such a mixture.

In one or more embodiments, the dielectric compounds when suitably ground may alternatively be mixed with silicone oil and a small amount of borax or sodium borohydride. When heated to 150° C., similar results of increases up to 250% as when the organic polymer suspensions were used are attained.

In the above-described embodiments, when the mixtures were placed between two electrodes in a capacitor arrangements with an approximate spacing of 10 microns, the use of either the shellac, zein, or silicone oil polymers or alternatively polyurethane, acrylic acid, methacrylic acid, methacrylic amides, polyvinylsulfonic acid, cyanoacrylates, polyvinylalcohols, polylactic acid, polyethylene terephthalate (PET), parylenes, or polyvinylsilanes resulted in undetectable leakage currents when the voltage between the electrodes was raised to 300V. To the contrary, when dielectric material such as barium titanate was ground and pressed in between the electrodes, it showed unacceptable leakage currents when tested at 300 V.

Due to the advantages of low temperature processing, a variety of organic dielectrics have been formed and tested. Classes of compounds that have been devised include several cesium and rubidium salts of organic acids. Additionally, salts of IB metals have been used in both the +1 oxidation state and the +2 oxidation state. Salts of the IIIA metals including gallium and indium in presumably the +1 oxidation state have been used.

In particular the salts of the following have been tested.
a) Cysteine
b) Taurine,
c) Carballylic acid
d) Citric acid
e) Glutathione
f) Citrulline g) Potassium dihydrogen phosphate
h) Ethylenediaminetetraacetic acid
i) Trithiocyanuric acid
j) Cyanuric acid
k) Tartaric acid
l) Salicylic acid
m) Arginine
n) Cystine
o) succinic acid
p) maleic acid Exceptional performance of the dielectric was obtained in the salt formation of the above acids using cesium and the rubidium ions that are good electrically polarizable ions. These organic salts may be easily formed by the use of the carbonate form of the elements mentioned. The carbonate form provides for a release of carbon dioxide and no undesired counterion contamination of the resulting ionic salt. However, it is clear that other inorganic single atom salts could be used (such as Cu(I) or Cu(II)) to provide similar dielectric properties without substantive change in the following procedures. Salts of these elements IA elements in addition to the silver and copper+1 oxidation states have shown good permittivities when used in a manner as set forth by the embodiments contained herein.

Modification of the resulting salts with thioureas and/or other related chemical species to the thioureas such as biurets, and modifications of the structures of the thioureas or thiobiurets show the dielectric permittivities to be enhanced over formulations that do not contain these species. When these sulfur containing compounds were used in conjunction with the salts mentioned above-described, then the resultant dielectrics in most cases displayed improved permittivities than without the sulfur containing formulations. Sulfur containing compounds used include, but are not limited to, N-allylthiourea, 1-(2-methoxyphenyl)-2-thiourea, trithiocyanuric acid, diphenylthiourea, and taurine. Sulfur compounds in the following list work.

a) Thioureas
b) Thiobiurets
c) Thiouracil
d) Mercaptans
e) Thiophenol

Amino acids and proteins can be used as well. Of particular significance is the use of glutathione, methionine, cysteine, and/or cystine which are sulfur containing amino acids. They have particular significance when used with guanidine to form salts. Also, the arginine amino acid is noted, since it contains both the basic guanidine moiety as well as the carboxylic acid group.

Common carboxylic acids have been used including citric acid, citrulline (an amino acid), succinic acid, and carballylic acid. Of particular note is the performance of the acids when the +1 salts of rubidium and cesium as well as the IB elements in their +1 oxidation states are used. Other ions that could be used in include In (I or II), Ga (I or II), either in conjunction with their less expensive IA and IIA elements or as single counterions.

Common bases other than the single atom salts mentioned previously can be used. Of particular significance is the salt of guanidine. In this molecule we have extended tautomers and electronic distribution in the protonated form. This helps distribute the electronic structure of the resultant salt and increase the polarizability of the species. In those salts increased dielectric permittivities were noted. In general amine bases and especially those in which there is extended conjugation of the charge in the base, provide a good counterbalanced charge carrier for the dielectric. Bases include amines, anilines, pyridines, anilines, and other nitrogen containing bases of this nature. Polymeric forms of nitrogen bases can also be used.

During the curing phase of manufacture a magnetic or electric field is imposed upon the dielectric material. It was noted that increased electric field results in increased permittivities. At low electric field potentials, the increase in permittivity was proportionally increased with the increase in the electric field potential. In some salts of inorganic metal ions an increase in the permittivity when placed in a magnetic field was observed. Additionally, it has been found that magnetic fields help in the enhancement of the dielectric's permittivity in purely organic compounds as well.

Utilization of both an electric field and a magnetic field can help reduce the requirements for the strength of either field when used in simultaneously with materials that respond to the magnetic field. When electric field strengths of almost any magnitude were impressed upon the dielectric when it was in a pliable or less viscous state, and increase in the permittivities of the resulting salt was shown. This again is possible due to the low temperature processes we have discovered. Electric field strengths greater than 100 V/cm were used to provide greater than 100% improvement in the permittivities of several different organic and inorganic dielectrics. Magnetic fields were also used to cause increases in the permittivities. Even relatively small magnetic field (i.e. >1 Gauss) has caused observable increases in the permittivity of polymeric materials and/or crystallization of polymers, small molecule organics, and salts of both inorganic and organic nature. Strong magnetic fields seem to induce greater amounts of permittivity increases than small fields. Permittivities in the range of 7 to >2000 have been observed utilizing the methods taught.

It may be that in the case of a molecule in which there is substantial polarization and/or separation of charge due to zwitterionic structures, the acid and the base may be contained within the molecule itself. In those cases, the ability to have high dielectric polarization may be "complete" within the single molecule itself. In several cases, we have seen good permittivities with amino acids where this exact form is present. In those cases, the selection of the solid matrix is important. This is where the selection of a polymer may come into play. However, in many protein matrices, the ionic forms may be encapsulated which the protein backbone itself. In the case of zein, this is thought to be an example where this has actually happened, produced a high permittivity dielectric.

The following representative embodiments will set forth specific examples of methods of making a high permittivity material in accordance with the present disclosure. It is understood that the disclosure need not be limited to the disclosed embodiments but it is intended to cover various modifications thereof, including combinations of the steps and components of the various examples.

I. Procedure for Making a Reduced Leakage Current Dielectric for Use in a Capacitor or Energy Storage Device.

In one exemplary embodiment, 1.5 g of zein is added to 15 mL of ethanol. A small amount of water is added or optionally the solution is filtered or centrifuged to remove any undissolved particulate matter. The resulting clear solution is then treated with 0.5 g to 15 grams of high permittivity inorganic salt such as barium titanate powder that has been previously treated to be made into a nano powder or other fine dispersion material. The resulting slurry is then mixed thoroughly and screened or otherwise spread on the target electrode. Addition of a small amount of DMSO (dimethylsulfoxide) or DMF (dimethyl formamide) will facilitate the screening and drying process. The "green sheet" material may then be dried at low temperature or alternatively clamped or otherwise pressed in contact with the other plate electrode. Elevated drying temperatures of not over approximately 60° C. (as excessive temperature can lead to bubble formation and cavitation of the film) are then maintained until all solvents have been removed. Further heating at 150° C. can be performed.

II. Procedure for Making a High Permittivity Dielectric Utilizing Low Temperature Methods In one or more embodiments, 0.75 g of strontium II carbonate is added to a stirred solution of 1.5 g gadolinium III carbonate in 15 mL of DI water. After dissolution of the two compounds takes place, a solution of 200 mg of zein (or other organic polymer) in 2 mL of water with 200 mg of sodium borohydride is added drop-wise to the metal solution with good stirring. The organic polymer material is optional if the dielectric material is to be formed or isolated without binder. A small amount of acetic acid may be added to facilitate the reduction. After 5 minutes 5 ml, of concentrated ammonium hydroxide is added. After 5 more minutes, the solution may be filtered and then screened, spread, or spun coated onto the desired electrode material and evaporated and treated as described in Procedure I. Or the solution can be evaporated to isolate the dielectric material as a solid.

III. Procedure for Reducing the Leakage Current in a Dielectric that has a Small Amount of Conductivity In one or more embodiments, 1.5 g of Zein is dissolved in 15 mL of ethanol. 5 to 50 mL slurry of the desired dielectric material is then treated with the zein solution with good agitation. The slurry may then be spread, screened, or spun coated onto the electrode and treated as described in procedure I to produce a device.

IV. Procedure for Reducing the Leakage Current Utilizing Shellac or ther Polymers and a High Permittivity Material In one or more embodiments, to a 1.5 g sample of the high permittivity material as produced by a procedure herein wherein the dielectric is isolated as a solid powder or in liquid form is added 1.5 g of commercial grade shellac solution (Zinnser #00301) that has been filtered or centrifuged to remove particulate matter. Additional ethanol can be added as needed to make the material into a workable slurry or solution. The resulting liquefied material can then be spread, screened or spun coated onto the electrode material as noted in procedure I.

V. Procedure for the Use of Silicone Oil and a Dielectric Material as a Capacitor In one or more embodiments, 1.0 g of silicone oil is added to a finely ground high permittivity dielectric of weight from 0 to 5 g. The mixture is well stirred and a small amount of sodium borohydride or borax salt (0 to 500 mg) is added to the slurry or solution. If the solution or mixture is workable, it can then be spread, screened, or spun, onto an electrode. The sheet can then be heated to approximately 150° C. to 300° C. for a few minutes to facilitate the increase in viscosity of the silicone oil. The top electrode can then be pressed or otherwise fastened with pressure to the silicone formed electrode and then heat treated for a period of time sufficient to fully stabilize the dielectric material. For example, approximately three hours at 150 to 200° C. is sufficient, although less time and different temperatures may be acceptable and are anticipated.

VI. Method of Making High Permittivity Organic Dielectrics:

1) Choose an organic acid. In the cases we have used to date, the more polarized the resultant conjugate base of the acid, the better the resulting dielectric will be in most cases. In several cases, the carboxylic acid salt has been used with good results. However, when the oxygen of the acid was replaced with a sulfur atom, the resultant dielectric had better permittivity. This is not a hard and fast rule; however, since the delocalization of the electronic cloud of the salt can take place by alternative means. The delocalized structures of cyanuric acid show that the addition of sulfur is not always necessary. Additionally, the less odoriferous nature of the non-sulfur (or selenium) containing compounds is also an advantage.

2) Choose a base. As with the acid, the base preferably, but not necessarily, needs to be polarized and have delocalized electrons when in its conjugate acid form. And, as with the acid, the same criteria regarding the selection of atoms should be noted.

3) Choose a polymer matrix. This is an optional step since the selection of the acid and base pair noted above may give a matrix whereby the next selection criteria are fulfilled. In other words the acid and base combination may ultimately produce a dielectric that is solid and stable to an electric field and have dissipation factors that make it a desirable formulation. In those cases the polymer in this step is not necessary. As an alternative to mixing the monomer or oligomeric species together with the high permittivity dielectric, the monomer, oligomer, or polymer may be used singularly or as a singular or multitude of thin layer(s) within the dielectric spacing of the capacitor (energy storage area).

4) If the acid/base mixture is to be used with the polymer, mix the acid and the base either individually or premixed with the polymer, or alternatively mix them separately from the polymer and isolate the resulting salt. The resulting salt can then be suspended with the monomer of the polymer selected or used with an oligomeric form of the polymer. In most situations, the salt (or otherwise bound molecular species, i.e. melamine-cyanuric acid complex) may be soluble in the monomer or oligomer with or without solvents, or it may be a slurry or heterogeneous mixture. It is possible to suspend solid forms of the ionic species (or polarizable species) in the matrix as is well known to those in the industry. A homogeneous or heterogeneous mixture is referred to herein as the "slurry".

5) Take the resulting mixture, either homogeneous, or otherwise, using methods well documented and known to those in the industry, apply the dielectric to one or both of a pair of electrodes. Before the polymer or the dielectric itself undergoes solidification either by cooling, polymerization, or other process whereby the viscosity or the solidification of the dielectric becomes large enough such that the dielectric is stable enough for the intended application, an electric field is applied to the dielectric. Alternatively, or in addition, a magnetic field can be applied to the dielectric when the species being solidified is paramagnetic or ferromagnetic in nature or has paramagnetic or ferromagnetic intermediate states that are influenced by the magnetic field. It may be that the resultant dielectric never becomes solid and remains in a liquid or viscous state, yet retains the increased dielectric permittivity.

6) While under the field(s), the solidification process or reorientation processes are allowed to be completed. The field(s) (either electrical, magnetic, or both) may now be removed. The dielectric may now be used between the electrode layers or removed and subsequently used in other applications.

Process and Methods

FIG. 1 is an exemplary flow chart illustrating a method for making a high permittivity dielectric material, according to an embodiment of the present disclosure. The method, create dielectric material 100, begins by dissolving an organic polymer in a solvent to form a slurry solution 105. The solvent may be shellac, silicone oil, other polymers, water, ethanol, and/or zein. Other suitable solvents are also anticipated. In one embodiment, removing any undissolved organic polymer from the slurry solution 110, is accomplished for example, by using a filter or centrifuge. Other means of removing undissolved organic polymer from the slurry solution are anticipated. Next, adding an inorganic salt to the slurry solution 115 is executed. The inorganic salt may be a transition metal salt, such as a Gd, Sr, Sn, and/or Fe salt followed by adding a breakdown voltage adjuvant to the slurry solution 120. The breakdown voltage adjuvant may include one or more of Y, Ni, Sm, Sc, Tb, Yb, La, Te, Ti, Zr, Ge, Mg, Pb, Hf, Cu, Ta, Nb, and/or Bi. Discovery and use of other suitable adjuvants is anticipated. The creation process for the slurry containing the dielectric material is then completed by adding materials to the slurry solution to facilitate screening and drying 125. This is accomplished by the addition of a small amount of dimethyl formamide and a Dimethylsulfoxide to the slurry solution 125.

Figure 2:
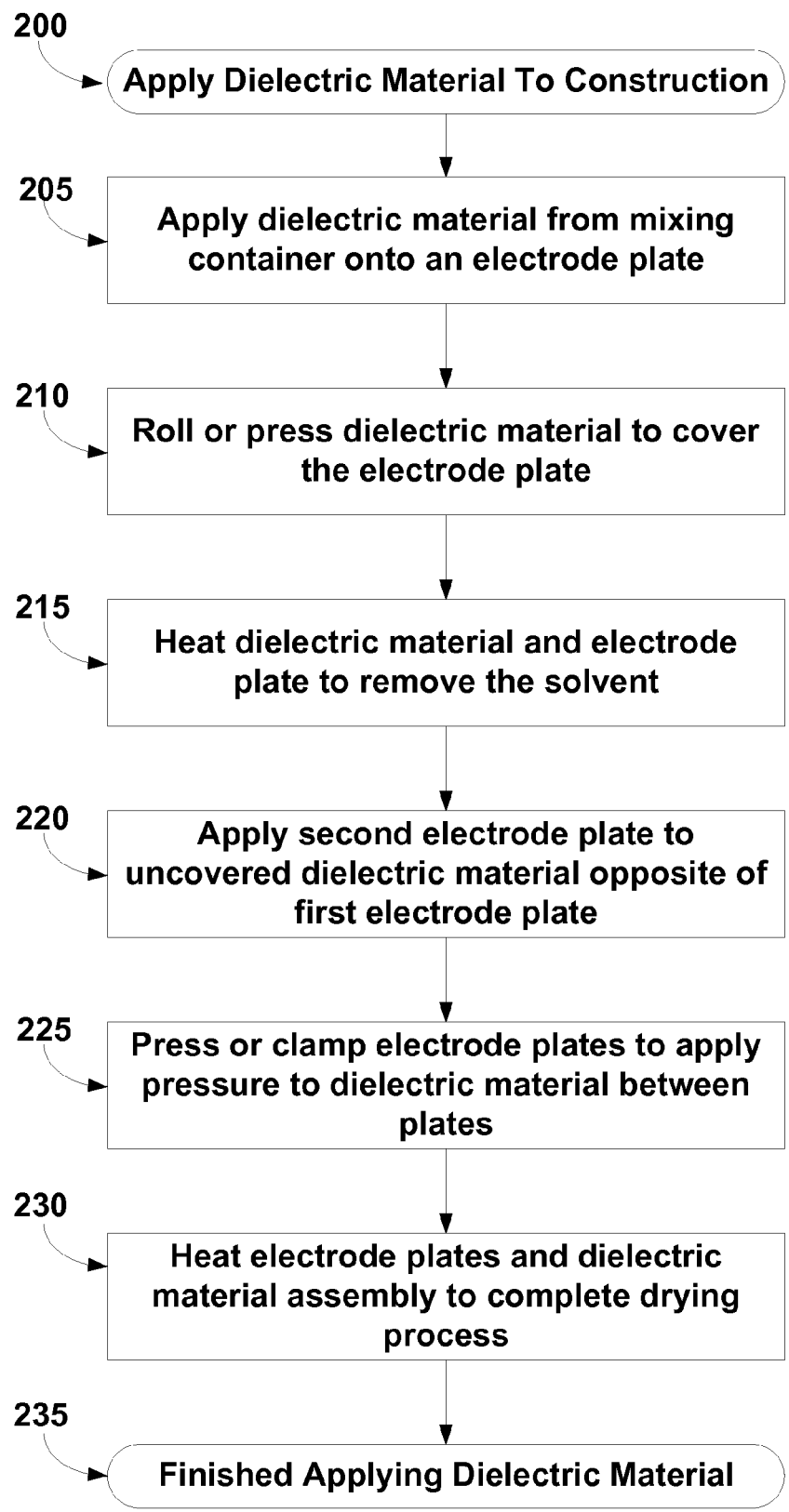
FIG. 2 is a process flow chart showing the steps used to apply the slurry to electrode plates and dry or cure the dielectric material.

FIG. 2 is an exemplary flow chart illustrating the continuing method for making a high permittivity dielectric material according to the present disclosure. FIG. 2 illustrates the next sequence of the method whereby the resulting slurry is applied to the assembly of electrode plates. Apply dielectric material to construction 200 is the beginning of the assembly process. Apply dielectric material from mixing container onto an electrode plate 205 results in an application of the slurry onto an electrode plate or one half of the capacitor. In a manufacturing environment this step may be accomplished by the slurry being coated onto a stationary or continuous moving strip of an electrode. In a lab environment or one-of manufacturing environment the slurry may be poured onto a statically positioned electrode plate through any number of means such as but not limited to pressure ejected from a container or poured form the mixing container. Other methodologies for moving the slurry from the mixing container to the electrode plate are anticipated. The next process step, roll or press dielectric material to cover the electrode plate 210 is performed to ensure an even thin coating of the slurry onto the electrode plate. Multiple means for performing this step are anticipated including but limited to the use of a spreading blade, roller, or other means. Gas phase deposition of the slurry can be accomplished through atomization of the slurry or chemical vapor deposition as known to those versed in the art. Process step 215 heat dielectric material and electrode plate to remove the solvent is performed to evaporate the solvent in the slurry. Process step 220 apply second electrode plate to uncovered dielectric material opposite of first electrode plate results in the basic high permittivity capacitor which is then ready to be completed. Process step 225 press or clamp electrode plates to apply pressure to dielectric material between plates ensures that any air or gas is forced out of the slurry mixture and the top and bottom electrodes (400 and 405 FIGS. 4A, 4B, 4C and 4D) are in complete contact with the slurry mixture containing the dielectric material. The resulting assembly as shown in FIGS. 4A through 4D is processed by step 230 heat electrode plates and dielectric material assembly to complete drying process. The slurry solution can be heated (depending on the deposition method) to a temperature of about 150 degrees Celsius to about 300 degrees Celsius to remove or evaporate the solvent. Other temperature ranges are anticipated dependent on the solvent used in the slurry. At this point, the process is complete at step 235 finished applying dielectric materials.

Figure 3:
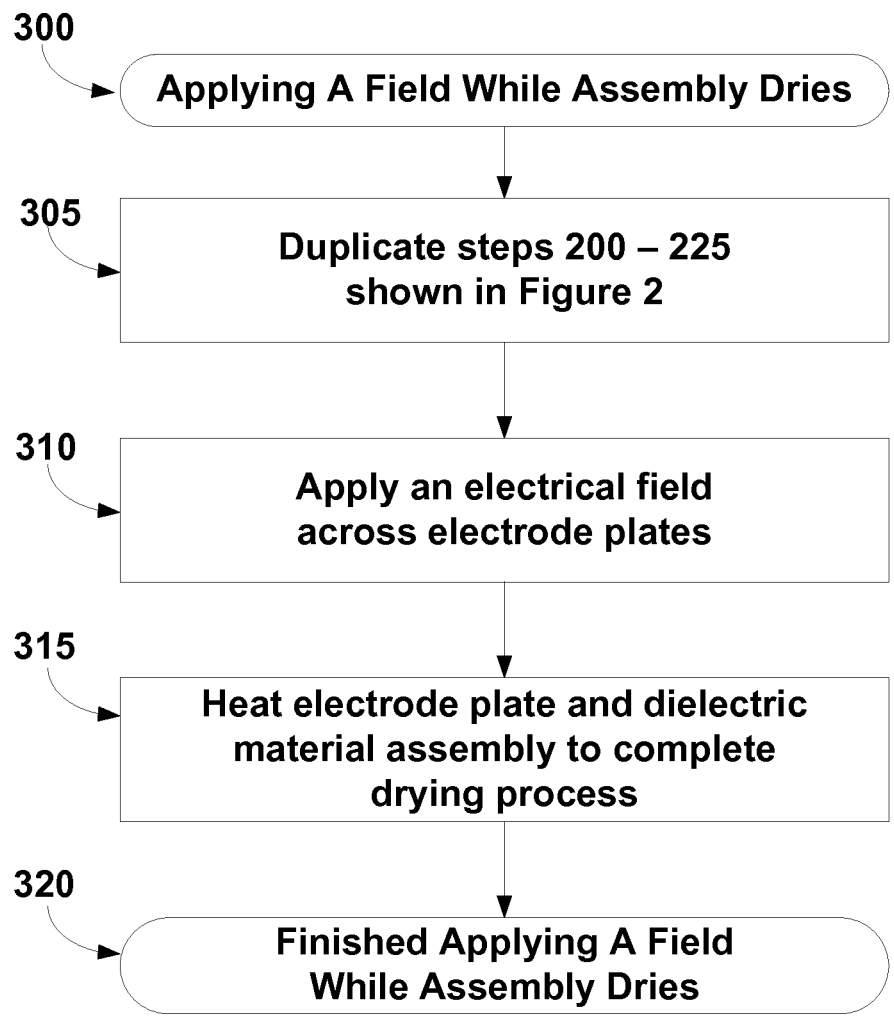
FIG. 3 is a process flow chart showing an alternate drying or curing process where an electric field is placed across the electrode plates while the dielectric material is being dried or cured.

FIG. 3 is an exemplary flow chart illustrating an additional embodiment for making a high permittivity dielectric material according to the present disclosure. It has been discovered and is hereby disclosed that when the dielectric compounds are allowed to "set, condense, or polymerize" in their matrix while under the potential of an electric field, or when the electrode plates were in contact with the dielectric slurry material, the permittivities of the resulting capacitors resulted in increased permittivities relative to the same materials not subjected to the electric or magnetic fields. Increases in permittivity of 100% or more have been obtained. The process shown and exemplified in FIG. 3 begins with applying a field while assembly dries 300. Process step 305 duplicate steps 200-225 have shown in FIG. 2 replicates the process of applying dielectric material to the electrode plates of a capacitor under construction. After the dielectric slurry mixture 410 has been placed between the electrode plates 400 and 405 and the electrode plates have been pressed or clamped step 310 apply an electric field across electrode plates is executed. This application of the electric field is shown in FIG. 4C. Note that FIG. 4C is a representation of a capacitor of the disclosed embodiments. The electrode plates of the said capacitor are shown as 400 and 405 with the dielectric material show as 410. These 3 components (400, 405, and 410) make up the disclosed capacitor. An electric field is applied to the said capacitor through connection of an electrical source shown schematically as battery 420. Battery 420 is connected to capacitor electrode plate 400 through connection wire 425 and connection wire 430 to capacitor plate 405. Connection wires 425 and 430 may also be spring contacts and other means of connection from the electrical source to the capacitor plates are also anticipated.

Additionally and alternatively as a substitute the processes noted above, described as liquid transfer processes, can also be executed as vapor phase transfers known to those skilled in manufacturing processes that require film production.

As can be seen from the foregoing description, the present method avoids the high temperature methods associated with prior high permittivity materials by the use of organic substrates to suspend, insulate, and coat the high dielectric materials. High process temperatures are also avoided by the present methods. In addition, a new method for making high permittivity materials is disclosed and when used in conjunction with the high breakdown voltage materials (such as shellac, zein, urethanes, epoxies, acrylics, vinyl polymers, polypropylene, PET, silicones, styrene, parylenes, TFE, and other fluorinated compounds), a process for making a high dielectric capacitor with a high breakdown voltage character is made possible.

Due to the nature of the process, the procedure is rugged in terms of control of leakage current. The coating material is a general material that seems to coat or insulate any material, including contamination materials and it will thereby make manufacture of the device easier and with better yields. Since it is difficult to make most good high permittivity dielectrics pure enough to display low conductivity (and thus producing high leakage currents), the use of organic binders in a matrix of high permittivity material is desirable because the contact of a conductive contamination or a defective crystal that may have conductivity is prevented by the coating of organic substrate.

Capacitor Cross Sectional Views

Figure 4A:
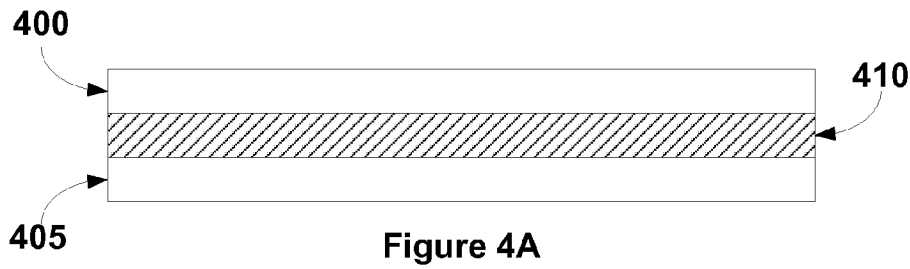
FIG. 4A is a depiction of a cross section of a high permittivity capacitor with a polymer matrix supporting particles of dielectric material.

FIG. 4A is a cross sectional view of a capacitor of the current embodiments. In this view and the views of FIGS. 4B, 4C, and 4D the component numbers 400 and 405 refer to the 2 electrode plates of the said capacitors. In FIGS. 4A and 4C component number 410 is showing the dielectric particles suspended in a polymer suspension of the current embodiments.

Figure 4B:
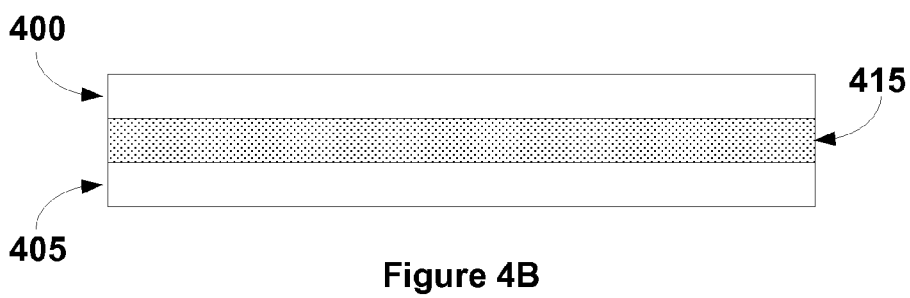
FIG. 4B is a depiction of a cross section of a high permittivity capacitor without a polymer matrix supporting particles of dielectric material.
Figure 4C:
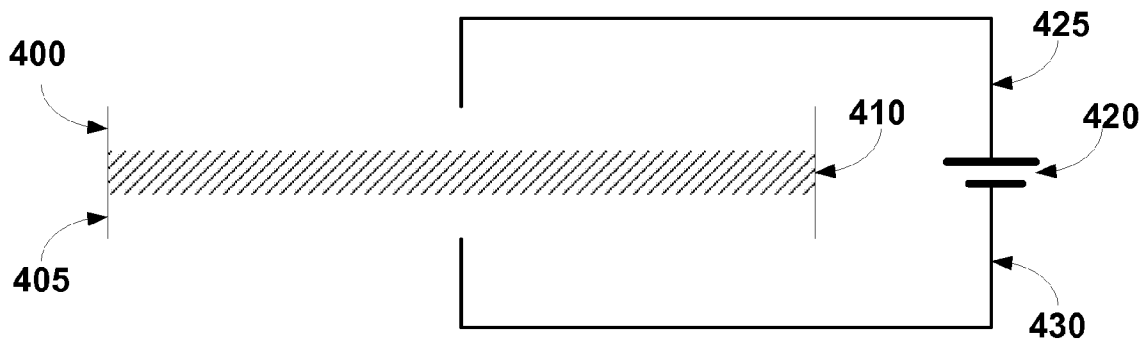
FIG. 4C is a depiction of a cross section of a high permittivity capacitor with a polymer matrix supporting particles of dielectric material and an apparatus to apply an electric field across the electrode plates.

FIG. 4B differs in that number 415 is showing a representation of dielectric particles not suspended in a polymer suspension. This type of construction results in a capacitor with a dielectric that exhibits high and unacceptable leakage currents.

Figure 4D:
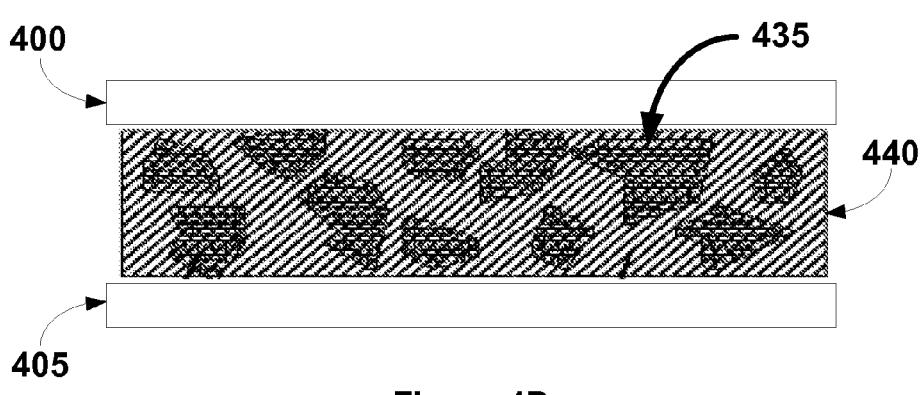
FIG. 4D is an expanded view depiction of a cross section of a high permittivity capacitor with a polymer matrix supporting particles of dielectric material.
Figure 4E:
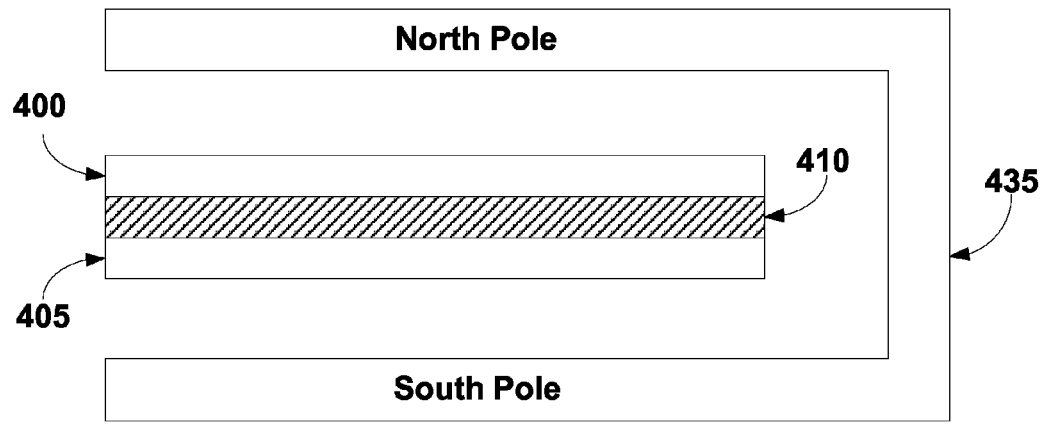
FIG. 4E is a depiction of a cross section of a high permittivity capacitor with a polymer matrix supporting particles of dielectric material and an apparatus to apply a magnetic field to the capacitor while it is being cured or dried.
Figure 4F:
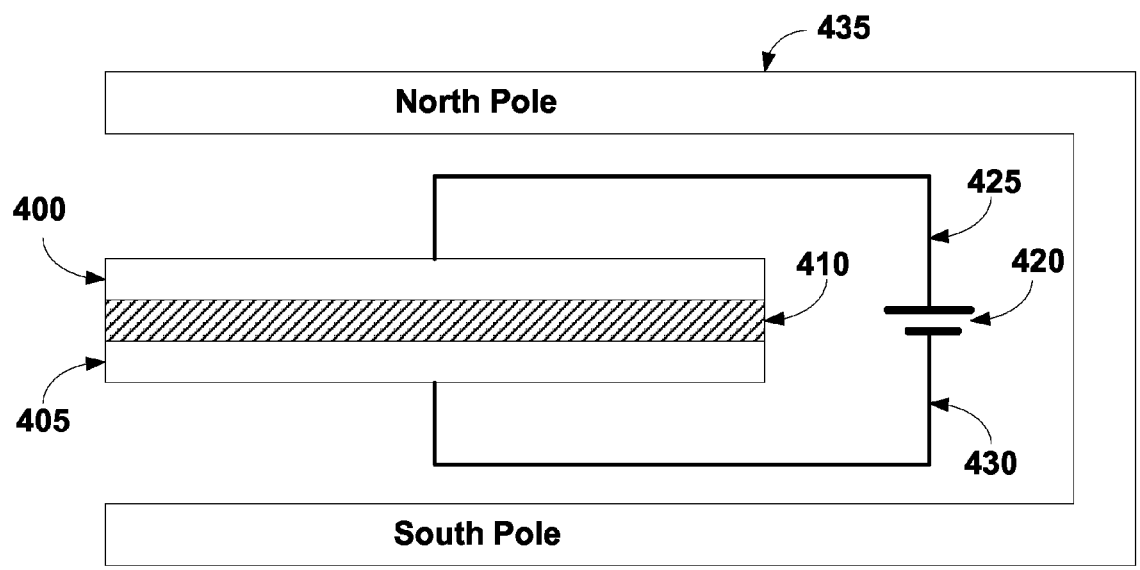
FIG. 4F is a depiction of a cross section of a high permittivity capacitor with a polymer matrix supporting particles of dielectric material and an apparatus to apply a magnetic field across the capacitor while it is being cured or dried and at the same instance, an electric field across the electrode plates.

FIG. 4D is a cross-sectional view of a high permittivity low leakage capacitor, according to an embodiment of the present disclosure. As illustrated, the capacitor electrode 400 and its opposite polarity electrode 405 are spaced apart approximately equally. In the intervening space are heterogeneous dielectric materials 430 and 435 are shown. In one embodiment, a dielectric material 440 may be formed from existing materials such as barium titanate or other such known high dielectrics 435, with an insulation material 430 such as parylene, zein, shellac, cross-linked silicones, or other such materials, to fill the intervening spaces between the high dielectric materials 430. Due to the improvements of this invention, a low temperature process using the insulation dielectric 430 can incorporate relatively low temperature stability and melting materials.

FIG. 4 E is a depiction of a high permittivity dielectric in a capacitor that has a magnetic field applied across the capacitor while the dielectric material is being cured or dried which will increase the permittivity of the dielectric material. In this figure, the capacitor assembly is composed of substrates or plates 400 and 405 which contain the dielectric material 410 between them. In this embodiment, a magnet 435 is placed such that the capacitor assembly resides between the north and south poles of magnet 435.

FIG. 4 F is a depiction of a high permittivity dielectric in a capacitor that has a magnetic field applied across the capacitor at the same time that an electric field is being applied across the electrodes while the dielectric material is being cured or dried which will increase the permittivity of the dielectric material. In this figure, the capacitor assembly is composed of substrates or plates 400 and 405 which contain the dielectric material 410 between them. In this embodiment, a magnet 435 is placed such that the capacitor assembly resides between the north and south poles of magnet 435 and at the same time voltage and voltage source 420 is connected through conductors 425 and 430 to capacitor electrodes 400 and 405 thus applying an electric field across the capacitor assembly.

The methods described herein provide a unique approach for making high permittivity capacitors without having to resort to standard high temperature manufacturing methods that almost no organic compound can withstand. This new approach vastly expands the materials by which these capacitors can be made, and increases the performance of the capacitors due to the reduced leakage currents that many organic polymers can display.

In one or more embodiments, Gd, Sr, Sn and Fe may be utilized as high permittivity dielectrics. In one or more embodiments, shellac, zein, and silicon oil may be used as high voltage breakdown adjuvants. Additional high breakdown adjuvants may be utilized, such as but not limited to phenolic polymers, polyesters, vinyl polymers, polyolefins, polyanhydrides, fluoropolymers, polycarbamates, inorganic polymers, and biopolymers. Examples include, but are not limited to, phenol formaldehyde resin (PF), polyethyleneterphalate (PET), polyacrylic acid and esters (PAA), polyethylene (PE), polypropylene (PP), polymaleic anhydride, polytetrafluoroethylenes and polyvinylidene fluoride (TFE, PVDF), polyvinylidene chloride, polyurethanes, polysilicones, and proteins. In other embodiments, other dielectrics and some breakdown voltage enhancers (adjuvants) may be utilized, such as but not limited to compounds containing Y, Ni, Sm, Sc, Tb, Yb, La, Te, Ti, Zr, Ge, Mg, Pb, Hf, Cu, Ta, Nb, Bi.

In one or more embodiments, organic carboxylic acids are used to form inorganic salts of various single atom ions. These single atom ions include, but are not limited to, IA, and IB elements of the periodic table. Additionally, IIA and IIB elements can be used. These salts when processed by the methods shown below result in greatly enhanced dielectrics.

In one or more embodiments, it was found that the sulfur analog of carboxylic acids and sulfur containing acids were desirable in their salt form utilizing the elements from the IA or IB series of the periodic table. Additionally, thioureas, thiobiurets, and their substituted analogs were found to enhance the dielectric properties.

In another embodiment, a layered dielectric is created with a first dielectric film layered on a different second dielectric film, each of which is composed of a primarily insulative film material and/or a high permittivity material. The film layers are sandwiched between and in contact with opposing first and second electrodes. Either during or after formation of the layers, permittivity of one or more layers is enhanced by one or more of: immersion in an electric field and/or magnetic field, and/or introducing a reductant into the film material.

In yet another embodiment, a mixed dielectric is created from an insulative film material and/or a high permittivity film material that exhibits a high permittivity. Again, The film is sandwiched between and in contact with opposing first and second electrodes. Either during or after formation of the film, permittivity is enhanced by one or more of: immersion in an electric field and/or magnetic field, and/or introducing a reductant into the film material.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices, other than capacitors, can be made using these techniques. Also, the inventor(s) intend that only those claims which use the words "means for" are intended to be interpreted under 35 USC 112, sixth paragraph.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method for the creation of an energy storage device that is comprised of a layered dielectric on a substrate, said method comprising:
creating a first dielectric film, said first dielectric film comprising a film material selected from the group consisting of a first insulative film material and a first film material that exhibits a high permittivity;
creating a second dielectric film in contact with the first dielectric film, said second dielectric film comprising a film material selected from the group consisting of a second insulative film material and a second film material that exhibits a high permittivity, wherein the second dielectric film has a different composition than the first dielectric film, said first dielectric film and said second dielectric film comprising dielectric film layers;
arranging the dielectric film layers between an electrically conductive first electrode and an electrically conductive second electrode, said electrically conductive first electrode being in direct physical contact with the dielectric film layers and said electrically conductive second electrode being opposite the first electrode and in direct physical contact with the dielectric film layers; and
enhancing permittivity of the dielectric film layers by performing a permittivity enhancing treatment on at least a portion of the dielectric film layers, said permittivity enhancing treatment comprising a treatment selected from the group consisting of:
immersing the portion of the dielectric film layers in a direct current electric field,
immersing the portion of the dielectric film layers in a magnetic field by placing the electrically conductive first electrode, the electrically conductive second electrode and the dielectric film layers between magnetic north and south poles of a magnetic source such that the magnetic field is about perpendicular to an outer surface of the electrically conductive first electrode and an outer surface of the electrically conductive second electrode, and
introducing sodium borohydride into the portion of the dielectric film layers.

2. The method of claim 1, wherein the first dielectric film comprises a first film material that exhibits a high permittivity, the first film material comprising polymers selected from the group consisting of parylenes, shellac, zein, silicone oil polymers, polyurethane, acrylic acid, methacrylic acid, methacrylic amides, polyvinylsulfonic acid, cyanoacrylates, polyvinylalcohols, polylactic acid, polyethylene terephthalate, polyvinylsilane, and combinations thereof.

3. The method of claim 2, wherein the first film material that exhibits a high permittivity further comprises an inorganic salt.

4. The method of claim 1, wherein the second dielectric film comprises a second film material that exhibits a high permittivity, the second film material comprising polymers selected from the group consisting of parylenes, shellac, zein, silicone oil polymers, polyurethane, acrylic acid, methacrylic acid, methacrylic amides, polyvinylsulfonic acid, cyanoacrylates, polyvinylalcohols, polylactic acid, polyethylene terephthalate, polyvinylsilane, and combinations thereof.

5. The method of claim 4, wherein the second film material that exhibits a high permittivity further comprises an inorganic salt.

6. The method for the creation of an energy storage device according to claim 1, said permittivity enhancing treatment being performed on each of the first and second dielectric films during creation of the first and second dielectric layers.

7. The method for the creation of an energy storage device according to claim 1, said permittivity enhancing treatment being performed on each of the first and second dielectric films after arranging the dielectric film layers.

8. A method for the creation of an energy storage device that is comprised of a mixed dielectric, said method comprising:
creating a dielectric film, said dielectric film comprising a film material selected from the group consisting of a first insulative film material and a first film material that exhibits a high permittivity;
arranging the dielectric film between an electrically conductive first electrode and an electrically conductive second electrode, the electrically conductive first electrode being in direct physical contact with the dielectric film and the electrically conductive second electrode being opposite the electrically conductive first electrode and in direct physical contact with the dielectric film; and
enhancing permittivity of the dielectric film by performing a permittivity enhancing treatment on at least a portion of the dielectric film, said permittivity enhancing treatment comprising a treatment selected from the group consisting of:
immersing the portion of the dielectric film to be treated with the permittivity enhancing treatment in a direct current electric field,
immersing the portion of the dielectric film to be treated with the permittivity enhancing treatment in a magnetic field by placing the electrically conductive first and second electrodes and the dielectric film between magnetic north and south poles of a magnetic source such that the magnetic field between the north pole of the magnetic source and the south pole of the magnetic source is about perpendicular to an outer surface of the electrically conductive first electrode and an outer surface of the electrically conductive second electrode, and
introducing sodium borohydride into the portion of the dielectric film to be treated with the permittivity enhancing treatment.

9. The method for the creation of an energy storage device according to claim 8, said permittivity enhancing treatment being performed on the dielectric film during creation of the dielectric film.

10. A method for creating a thin coating of high permittivity dielectric material on a substrate, said method comprising:
providing a wetting agent solution by combining an organic polymer with a solvent and mixing the combined organic polymer with the solvent;
combining said wetting agent solution with a high permittivity dielectric material;
mixing said wetting agent solution with the high permittivity dielectric material to create a slurry;
spreading the slurry in a coating onto a first substrate;
placing a second substrate onto the slurry opposite the first substrate, the slurry being disposed between and in direct physical contact with the first substrate and with the second substrate thereby forming an assembly; and (i) applying a direct current electric field by connection of a direct current voltage source across the first substrate, the slurry, and the second substrate, or (ii) placing the assembly between magnetic north and south poles of a magnetic source such that a magnetic field between the north pole of the magnetic source and the south pole of the magnetic source is about perpendicular to an outer surface of the first substrate and an outer surface of the second substrate.

11. The method of claim 10, further comprising:
placing said assembly between the magnetic north and south poles of the magnetic source, while applying the direct current electric field.

12. The method of claim 11, wherein the strength of said magnetic field is greater than 1 Gauss.

13. The method of claim 12, further comprising, while said assembly is placed between the magnetic north and south poles of the magnetic source and the direct current electric field is applied, setting the slurry by performing a step selected from the group consisting of curing the slurry and drying the slurry.

14. The method of claim 10, further comprising applying a direct current electric field by connection of a direct current voltage source across the first substrate, the slurry, and the second substrate, wherein the strength of said direct current electric field is greater than 100 V/cm.

15. The method of claim 14, further comprising, while applying the direct current electric field, setting the slurry by performing a step selected from the group consisting of curing the slurry and drying the slurry.

16. The of claim 10, further comprising placing the assembly between magnetic north and south poles of a magnetic source such that a magnetic field between the north pole of the magnetic source and the south pole of the magnetic source is about perpendicular to an outer surface of the first substrate and an outer surface of the second substrate, wherein the strength of said magnetic field is greater than 1 Gauss.

17. The method of claim 16, further comprising, while said assembly is placed between the magnetic north and south poles of the magnetic source, setting the slurry by performing a step selected from the group consisting of curing the slurry and drying the slurry.

18. The of claim 10, further comprising adding a reducing agent to said wetting agent solution.

19. The method of claim 18, said reducing agent comprising sodium borohydride.

20. The method of claim 10, further comprising:
dding a drying agent to the wetting agent solution; and
allowing the wetting agent solution to dry.

21. The method of claim 10, said organic polymer comprising a substance selected from the group consisting of parylene, shellac, zein and silicone oil.

22. The method of claim 10, further comprising adding an iron cation to said wetting agent solution.

23. A method for creating a thin coating of high permittivity dielectric material on a substrate, said method comprising:
providing a first solution comprising a polymer mixed with a cross-linking agent; combining said first solution with a high permittivity dielectric material;
mixing said first solution with the high permittivity dielectric material to create a slurry;
spreading said slurry in a coating onto a first substrate;
applying a second substrate onto the coating of the slurry such that the slurry is disposed between and in direct physical contact with the first substrate and with the second substrate; and
applying a permittivity enhancing field across the first substrate, the slurry and the second substrate, the permittivity enhancing field comprising a field selected from the group consisting of
a direct current electric field generated by connecting a direct current voltage source across the first substrate, the slurry, and the second substrate, and
a magnetic field provided by placing the first substrate, the slurry, and the second substrate between magnetic north and south poles of a magnetic source such that the magnetic field between the north pole of the magnetic source and the south pole of the magnetic source is about perpendicular to an outer surface of the first substrate and an outer surface of the second substrate.

24. The method for creating a thin coating of high permittivity dielectric material on a substrate of claim 23, further comprising adding a reducing agent to said first solution.

25. The method for creating a thin coating of high permittivity dielectric material on a substrate of claim 24, said reducing agent comprising sodium borohydride.

26. The method for creating a thin coating of high permittivity dielectric material on a substrate of claim 23, the polymer comprising a substance selected from the group consisting of a parylene, shellac, zein, and silicone oil; and said cross linking agent comprising an agent selected from the group consisting of divinylsilane, cyanoacrylate, and an epoxy.

27. The method for creating a thin coating of high permittivity dielectric material on a substrate of claim 23, further comprising adding an iron cation to the polymer.

28. The method for creating a thin coating of high permittivity dielectric material on a substrate according to claim 23, said method further comprising removing any particulate matter that is not dissolved into said first solution.

* * * * *